US007337318B2

(12) United States Patent
Birk et al.

(10) Patent No.: US 7,337,318 B2
(45) Date of Patent: Feb. 26, 2008

(54) METHOD AND APPARATUS FOR PREVENTING ROGUE IMPLEMENTATIONS OF A SECURITY-SENSITIVE CLASS INTERFACE

(75) Inventors: Peter Daniel Birk, Austin, TX (US); Ching-Yun Chao, Austin, TX (US); Hyen Vui Chung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 10/376,113

(22) Filed: Feb. 27, 2003

(65) Prior Publication Data

US 2004/0172530 A1 Sep. 2, 2004

(51) Int. Cl.
*H04L 9/00* (2006.01)
(52) U.S. Cl. .................. 713/167; 713/155; 713/172; 717/116; 717/118; 717/108
(58) Field of Classification Search ................ 713/155, 713/167; 717/108, 116–118
See application file for complete search history.

(56) References Cited

U.S. PATENT DOCUMENTS

| 5,802,291 | A  | * | 9/1998  | Balick et al. ............... 709/202 |
| 6,125,447 | A  | * | 9/2000  | Gong ........................... 726/17 |
| 6,134,597 | A  | * | 10/2000 | Rieth et al. ................. 709/237 |
| 6,243,859 | B1 | * | 6/2001  | Chen-Kuang ............... 717/111 |
| 6,643,652 | B2 | * | 11/2003 | Helgeson et al. ............. 707/10 |
| 6,714,930 | B1 | * | 3/2004  | Garrison et al. ............... 707/9 |
| 6,754,711 | B1 | * | 6/2004  | Dodrill et al. ............... 709/227 |
| 6,792,466 | B1 | * | 9/2004  | Saulpaugh et al. ......... 709/229 |
| 7,089,242 | B1 | * | 8/2006  | Chan et al. .................... 707/9 |
| 7,096,491 | B2 | * | 8/2006  | Cheng ........................... 726/4 |
| 2004/0088578 | A1 | * | 5/2004 | Chao et al. ................. 713/201 |

\* cited by examiner

*Primary Examiner*—Nasser Moazzami
*Assistant Examiner*—Fikremarima Yalew
(74) *Attorney, Agent, or Firm*—Duke W. Yee; Justin Dillon; Cathrine K. Kinslow

(57) ABSTRACT

A method and apparatus for preventing rogue implementations of a security-sensitive class interface are provided. With the method and apparatus, a unique identifier (UID) is created by a server process when the server process is started. Anytime the server process, i.e. a server runtime environment, instantiates a new credential object following start-up of the server process, the encrypted UID is placed into a private field within the new credential object. In addition, the UID is encrypted and stored in a private class of the server runtime environment. A verification class is provided within the server runtime environment which includes one or more methods that receive the credential object as a parameter and return true or false as to the validity of the credential object. These one or more methods determine the validity of the credential object by retrieving the encrypted UID from the private class stored in the server runtime environment, decrypting the UID and comparing it to the decrypted UID stored in the private field of the credential object. If the two UIDs match, a determination is made that the credential object was created by the server runtime environment rather than a rogue application. If the two UIDs do not match, or if there is no UID in the credential object, then a false result will be returned by the verification class.

6 Claims, 3 Drawing Sheets

METHOD AND APPARATUS FOR PREVENTING ROGUE IMPLEMENTATIONS OF A SECURITY-SENSITIVE CLASS INTERFACE

BACKGROUND OF THE INVENTION

1. Technical Field

The present invention is directed to a method and apparatus for preventing rogue implementations of a security sensitive class interface. More specifically, the present invention provides a mechanism for validating instantiated credentials in a server runtime environment to verify that the credential was instantiated by the server runtime environment.

2. Description of Related Art

One main purpose of an object oriented programming language interface, such as a Java interface, is to act as a contract that determines what method signatures a class must implement. When a class of this interface type is instantiated, the interface can be used as a way to pass the instance of the class, i.e. an object, into and out of methods with the runtime environment or to access methods on the instance of the class. The use of the interface helps to prevent the user of the interface from having to have knowledge of the instantiated object. Typically, the interface is a desirable feature in object oriented programming languages such as Java.

However, there are times when it is necessary to ensure that instantiated objects that implement an interface can be trusted. In the way of explanation of the use of the terms "implementation" and "instantiated object" or "instantiation", an "implementation" of an interface is a class that contains those methods defined by the interface and the implementation of those methods while an "instantiation" of this implemented class refers to a real object in the runtime environment that represents the implementation.

Trusting an object's implementation of an interface is typically done by securing the class loading environment so that any rogue implementations of the interface cannot be loaded in the process space. However, with the advent of web application servers, web applications run side-by-side with other web applications within the same Java process. In such an environment, the concern for in-process security is increasing and securing the class loading environment is not by itself a sufficient mechanism for ensuring that object implementations of an interface have not been impersonated and thus may be trusted.

To address this issue, some technologies, such as Java 2 Security, have been provided to prevent access to methods. However, this implies that the object implementation of the interface be preserved or trusted. For example, one can put a Java2 Security permission check at the beginning of a method within an implementation. This allows only those processes with permission to access the method to be able to actually invoke the method. This can only prevent access to methods when the Java 2 Permission checks are defined in a method within the implementation. If someone overrides the implementation, then these checks are no longer there. Thus, a problem arises in that there is no known way to prevent a person from implementing the interface and passing an impersonated object through the runtime as though it was the actual runtime object.

This is especially a problem with security-sensitive classes that are used to handle private or secure information. For example, in the security runtime environment of an application server, a credential is a class which contains very sensitive information about a user of the system. The credential can be used to grant a user access to an application resource, such as a banking application or other application which is to remain secure. In such an application, it is vital that a credential be trusted completely.

Typically, a credential is an object implementation of an interface. There may be multiple types of the credential for different authentication mechanisms. For methods that are common to all the types of credentials, it is desirable to reference the credentials using the same interface. The danger resides in having someone implement their own credential, i.e. a rogue credential not generated by the server runtime environment, which meets all the requirements of the credential interface.

Therefore it would be beneficial to have an apparatus and method that prevents rogue implementations of a security sensitive class interface from being used with a server runtime environment to gain access to secure resources. Moreover, it would be beneficial to have an apparatus and method that can be used to validate that an object implementation of an interface belongs to the server runtime and is not an impersonation by a rogue application.

SUMMARY OF THE INVENTION

The present invention provides a method and apparatus for preventing rogue implementations of a security-sensitive class interface. With the method and apparatus of the present invention, a new type of token is provided that is inserted into security credentials. This new type of token is a unique identifier (UID) that is created by a server process when the server process is started. Anytime a server process, i.e. a server runtime environment, instantiates a new credential object following start-up of the server process, the encrypted UID is placed into a private field within the new credential object. In addition, the UID is encrypted and stored in a private class of the server runtime environment.

A verification class is provided within the server runtime environment. The verification class includes one or more methods that receive the credential object as a parameter and return true or false as to the validity of the credential object. These one or more methods determine the validity of the credential object by retrieving the encrypted UID from the private class stored in the server runtime environment and compares it to the encrypted UID stored in the private field of the credential object. This can be done with a simple byte array comparison since they are the same byte array.

For even tighter security, each credential object may get the UID which is encrypted uniquely for each credential object instance. In this case, the UID must be decrypted each time it is validated to compare the UID. While this is more secure, it is also more costly with regard to performance. Therefore, in most cases, it is safe to simply copy the same encrypted UID to all credential objects and compare them to the master encrypted UID via byte comparison.

If the two UIDs match, a determination is made that the credential object was created by the server runtime environment rather than a rogue application. If the two UIDs do not match, or if there is no UID in the credential object, then a false result will be returned by the verification class.

These and other features and advantages of the present invention will be described in, or will become apparent to those of ordinary skill in the art in view of the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides a mechanism for validating the implementation of security sensitive class interfaces in a runtime environment. The present invention is especially well suited for use in a distributed data processing environment, such as a local area network, wide area network, the Internet, or the like. Moreover, the present invention is provided in an object-oriented runtime environment, such as a Java runtime environment. Therefore, a brief description of a distributed data processing system and a Java runtime environment will first be provided as a context for the description of the preferred embodiments of the present invention.

Figure 1:
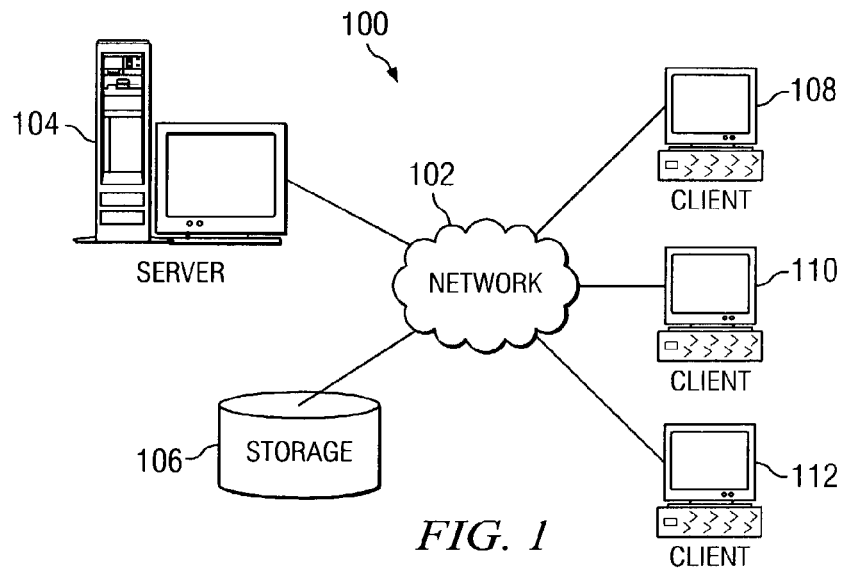
FIG. 1 is an exemplary block diagram of a distributed data processing system in accordance with the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
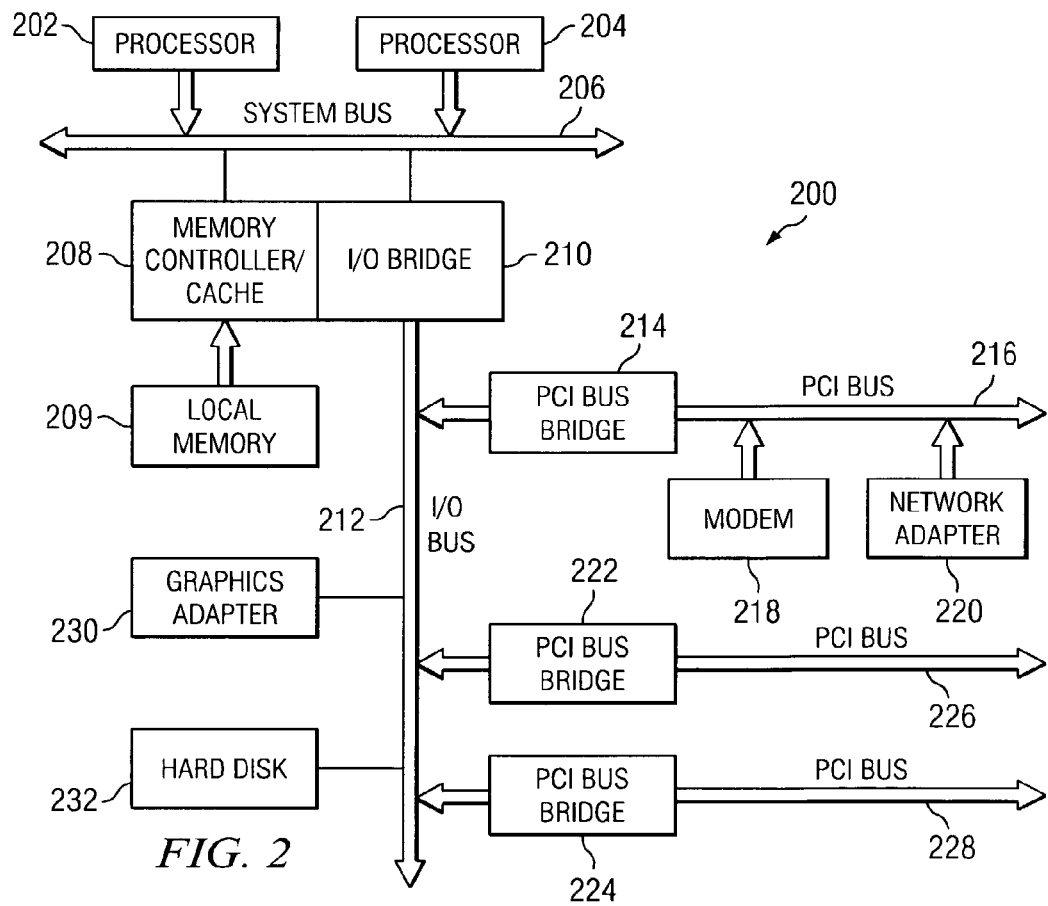
FIG. 2 is an exemplary block diagram of a server computing device in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209 I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
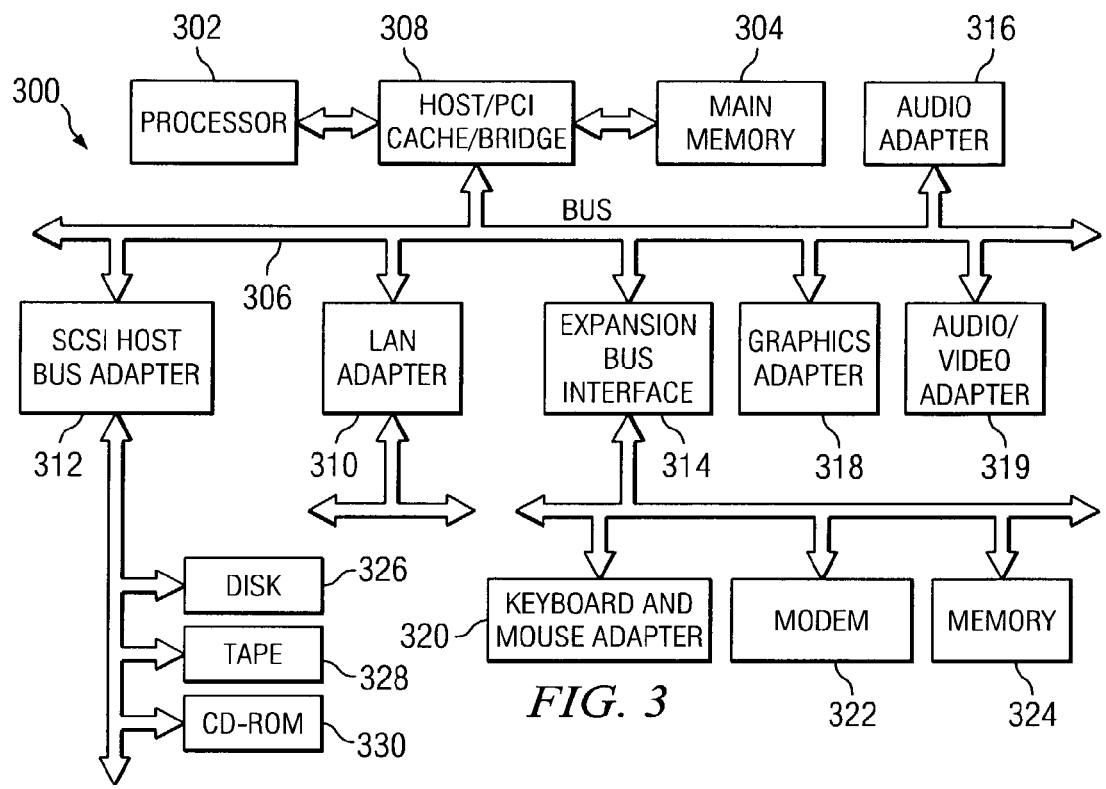
FIG. 3 is an exemplary block diagram of a client computing device in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

In preferred embodiments of the present invention, a server is provided in which a server runtime environment executes. A client device communicates with the server via one or more computer networks, such as the Internet. The server runtime environment may be, for example, an object-oriented server runtime environment, such as a Java runtime environment. With such an environment, the client device may communicate with the server runtime environment through the use of Java applets, for example.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

The client device may include a Java Virtual Machine (JVM) that allows Java programs to be executed on different platforms as opposed to only the one platform for which the code was compiled. Java programs are compiled for the JVM. In this manner Java is able to support applications for many types of data processing systems, which may contain a variety of central processing units and operating systems architectures.

To enable a Java application to execute on different types of data processing systems, a compiler typically generates an architecture-neutral file format—the compiled code is executable on many processors, given the presence of the Java run time system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

Every Java virtual machine contains the Abstract Windows Toolkit (AWT). This toolkit contains primitives for basic windowing functionality. These primitives include such user-interface functionality as window and dialog box manipulation, text rendering, buttons, check box, and radio button creation and manipulation, as well as graphics primitives such as line drawing, color choice, etc. Virtually all more sophisticated graphics and user-interface tools are built on top of these AWT primitives.

Having given a brief overview of a distributed data processing environment and an object-oriented runtime environment, e.g., a Java runtime environment, the present invention is directed to a mechanism for validating that an implementation of a security-sensitive class interface has been created by the processes of the Java runtime environment on a server. The present invention provides protections against rogue applications from creating rogue implementations of a security-sensitive class interface that meet the requirements of the interface but are not trusted by the server runtime environment.

For purposes of the following description of the preferred embodiments, the implementation of the security-sensitive class interface utilized with the present invention will be assumed to be a security credential. As stated previously, a security credential is an implementation of a class which contains very sensitive information about a user of a system. Security credentials typically include encrypted tokens which are used to represent a user identity. However, the purpose of this token is to be sent to a downstream server for use by the server rather than for any validation of the credential itself. It is prohibitively expensive, in terms of computational time, to validate the token, within the same process runtime which it was generated, at each point throughout the security runtime where important decisions are made. At any point the credential implementation could be impersonated and thus throughout the runtime environment, validating the implementation is very important.

Typically, the only time such a token is validated is when the token is received by another process in the downstream server. At the downstream server, the token is decrypted by shared keys and a new credential is created in the downstream server. However, when this new credential is created, it is not validated again within the same process.

The present invention introduces a new type of token that is encrypted in security credentials. This new type of token is a unique identifier (UID) that is created by a server process when the server process is started. Anytime the server process, i.e. a server runtime environment, instantiates a new credential object following start-up of the server process, the encrypted UID is placed into a private field within the new credential object. In addition, the UID is encrypted and stored in a private class of the server runtime environment. By "private" what is meant is that the class implementation is protected from impersonation by the class loader and file system and there is only one instance of this implementation that is not passed around the system. One cannot impersonate such a class as there is no interface defined and there is only to be a single instance ever created within the server runtime.

Figure 4:
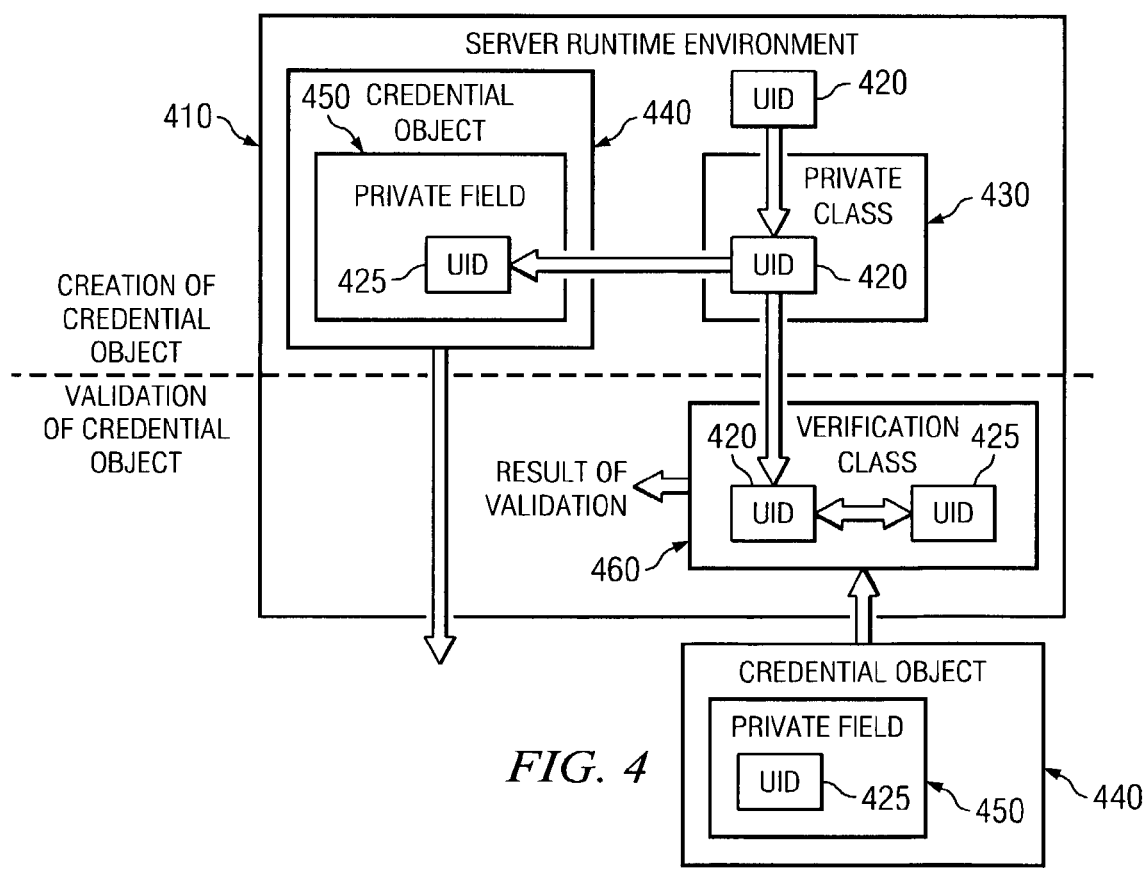
FIG. 4 is an exemplary diagram illustrating a process for creating a credential using the mechanisms of the present invention.

A verification class is provided within the server runtime environment. The verification class includes one or more methods that receive the credential object as a parameter and return true or false as to the validity of the credential object. These one or more methods determine the validity of the credential object by retrieving the encrypted UID from the private class stored in the server runtime environment, decrypting the UID and comparing it to the decrypted UID stored in the private field of the credential object. If the two UIDs match, a determination is made that the credential object was created by the server runtime environment rather than a rogue application. If the two UIDs do not match, or if there is no UID in the credential object, then a false result will be returned by the verification class. Alternatively, decryption may not be necessary, as discussed hereafter, and a byte array comparison may be utilized to compare the two UIDs FIG. 4 is an exemplary diagram illustrating a process for creating a credential using the mechanisms of the present invention. As shown in FIG. 4, the server runtime environment 410 creates a unique identifier (UID) 420 at startup and stores the UID 420 in a private class 430. The UID 420 may be any unique identifier that may be generated by the server runtime environment. In a preferred embodiment, the UID 420 is a randomly or pseudo-randomly generated set of alphanumeric characters. The mechanisms for generation of random or pseudo-random sets of alphanumeric characters are generally known in the art and any such mechanism may be used with the present invention to generate a UID for use with the present invention.

When the server runtime environment 410 must instantiate a credential object, the credential object 440 is created and the UID 420 is placed in a private field 450 of the credential object 440 (the copy of the UID 420 in the private field 450 is references as 425 for clarity). That is, the UID 420 is obtained from the private class 430 and written to the private field 430 as UID 425. Of course, the storing of the UID 420 in the private class 450 and the copy of the UID 425 in the private field 450 may include encrypting the UID prior to storing it in these locations. Moreover, any type of encryption, e.g., public-private key, performing a hash function on the UID, or the like, may be used without departing from the spirit and scope of the present invention.

Thereafter, when the credential object 440 is again presented to the server runtime environment 410, the server runtime environment 410 performs a verification of the credential object 440 using a verification class 460. The verification class 460 receives the credential object 440 as a parameter and checks the UID 425 stored in the private field 450 of the credential object 440 to determine if the credential object 440 was created by the server runtime environment 410. That is, 1) the verification class 460 decrypts the UID 425 in the private field 450, retrieves the encrypted UID 420 from the private class 430, decrypts the UID 420 from the private class 430, and compares the two UIDs 420 and 425 or 2) the verification class 460 performs a byte array comparison between the encrypted UID 425 from the credential with the encrypted UID 420 from the private class 430. Option 2) is better performing but has a little less security. If the two UIDs 420 and 425 match, then the credential object 440 is verified and the application providing the credential object 440 may be allowed to access server resources. Otherwise, the credential object 440 is not verified and appropriate actions can be performed to deny access to server resources.

It should be noted that while FIG. 4 illustrates the present invention in terms of a single credential object 440, the present invention may be extended to multiple credential objects 440 in the same or different server runtime environments or to any other Java object which implements a Java interface. That is, within the same server runtime environment, a plurality of credential objects may be created. Each of these credential objects will have the same UID in their private fields. The UID is only generated at startup of the server process, i.e., server runtime environment.

Next, a specific implementation of the present invention will be described in which various new classes for performing the present invention within a webSphere™ Java runtime environment are illustrated. It should be clear that the present invention is not limited to this particular implementation and other implementations of the present invention may be used without departing from the spirit and scope of the present invention.

The specific implementation of the present invention in the WebSphere™ Java runtime environment includes a ServerCredSigner class, a WSCredentialImpl class, and a Context Manager class. The ServerCredSigner class is a class which contains the master UID for a typical user credential and another master UID for a server credential A user credential is one which represents a user of the system. A server credential is typically a singleton credential (i.e., only one exists for the entire process) which represents the server itself and can perform more sensitive administrative operations. Because a server credential can perform more sensitive administrative operations, a different UID is used to ensure differentiation between a server instance and a user instance of the WSCredentialImpl implementation class. This is not to say a user credential may perform less-sensitive operations, but it does separate the user operations from administrative operations by allowing a server credential only to perform certain administrative operations.

The UIDs are encrypted and stored in the ServerCredSigner class. The ServerCredSigner class has the following methods:

protected byte[] getEncryptedWSCredSigner( );
protected byte[] getEncryptedServerSigner( );
protected boolean isServerCred (WSCredential cred);
protected boolean iswSCred (WSCredential cred);

The getEngryptedWSCredSigner( ) method returns the encrypted user UID. It is protected so that only classes in the same package can access it. Also, this method is protected by Java 2 Security so that only authorized users can call this method.

The getEncryptedServerSigner( ) method returns the encrypted server UID. This method is protected by Java 2 Security also so that only authorized users can call this method.

The isServerCred (WSCredential cred) method performs the validation of the WSCredentialImpl to determine if it is a server credential. Note that the WSCredential is the interface of WSCredentialImpl and thus, any class that implements WSCredential may be passed into this method. This determines if the credential passed in contains the server's UID.

The isWSCred (WSCredential cred) method does the validation of the WSCredentialImpl to determine if it is a user credential in a similar manner as discussed above with regard to the isServerCred method.

The WSCredentialImpl class is a class used to implement a credential interface. This class contains credential methods but also contains the following methods relative to the present invention:

Protected void markServerCred(byte[ ] cipher);
Protected byte[ ] getServerCredCipher( );
Protected byte[ ] getwScredCipher( );

The markServerCred(byte[] cipher) method is only accessible by the ContextManager to pass in the encrypted server UID. This will mark the WSCredentialImpl as a server credential and is only done to a single credential in the runtime environment.

The getServerCredCipher( ) method is used by the ServerCredSigner class to obtain a copy of the server UID within the credential to verify if it is a server credential. Java 2 Security protects access to this method.

The getWSCredCipher( ) method is used by the ServerCredSigner class to obtain a copy of the user UID within the credential to verify if it is a user credential. Java 2 Security also protects access to this method.

The ContextManager class is used by other runtime environment classes and includes two methods for performing credential validation throughout the runtime:

public Boolean isServerCred(WSCredential cred) throws WSSecurityException;
public Boolean isWSCred(WSCredential cred) throws WSSecurityException;

All external components call isServerCred(cred) to determine if a credential object is a server credential, i.e. a credential with higher authority for administrative purposes. For general authorization purposes, a component may call isWSCred(cred) to determine if the implementation is one created by the runtime environment. If either of these methods returns false, a security exception is thrown.

It should be noted that the ServerCredSigner methods for isServerCred and isWSCred are protected. This means they can only be accessed by other classes within the same Java package (a namespace for Java objects). Only the ContextManager class will invoke these ServerCredSigner protected methods. Other parts of the Security runtime environment will invoke the ContextManager methods instead. So in effect, using the present invention only two methods, i.e. isServerCred (WSCredential cred) and isWSCred (WSCredential cred), are being exposed to the security runtime environment, but the ContextManager has access to all of the protected methods within the ServerCredSigner class.

Figure 5:
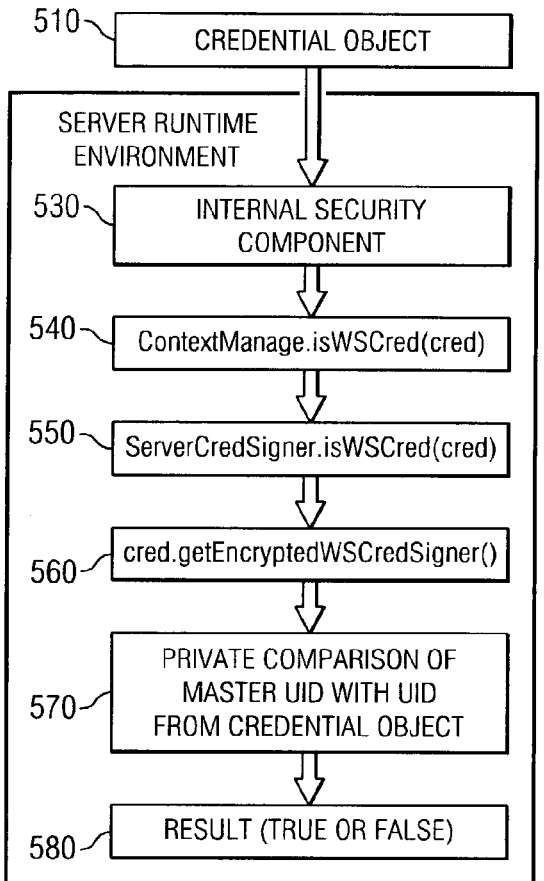
FIG. 5 is an exemplary diagram illustrating a call chain utilized by an exemplary embodiment of the present invention.

FIG. 5 is an exemplary diagram illustrating a call chain utilized by an exemplary embodiment of the present invention. As shown in FIG. 5, when a credential object 510 is passed to the runtime environment 520, an internal security component 530 of the runtime environment 520 calls the public method ContextManager.isWSCred(cred) 540. The ContextManager.isWSCred(cred) method 540 is a method called by all components that wish to determine if the credential object is a credential generated by the server runtime environment.

The ContextManager.isWSCred(cred) method 540 calls the protected ServerCredSigner.isWSCred(cred) method 550 which is used to perform the actual verification of the credential object 510. The ServerCredSigner.isWSCred (cred) method 550 obtains the master UID stored in the ServerCredSigner class and calls the protected cred.getEncryptedWSCredSigner( ) method 560. The cred.getEncryptedWSCredSigner( ) method 560 obtains the UID from the credential object. Thereafter a private comparison between the master UID and the credential UID is performed 570 and a true or false result 580 is returned.

Figure 6:
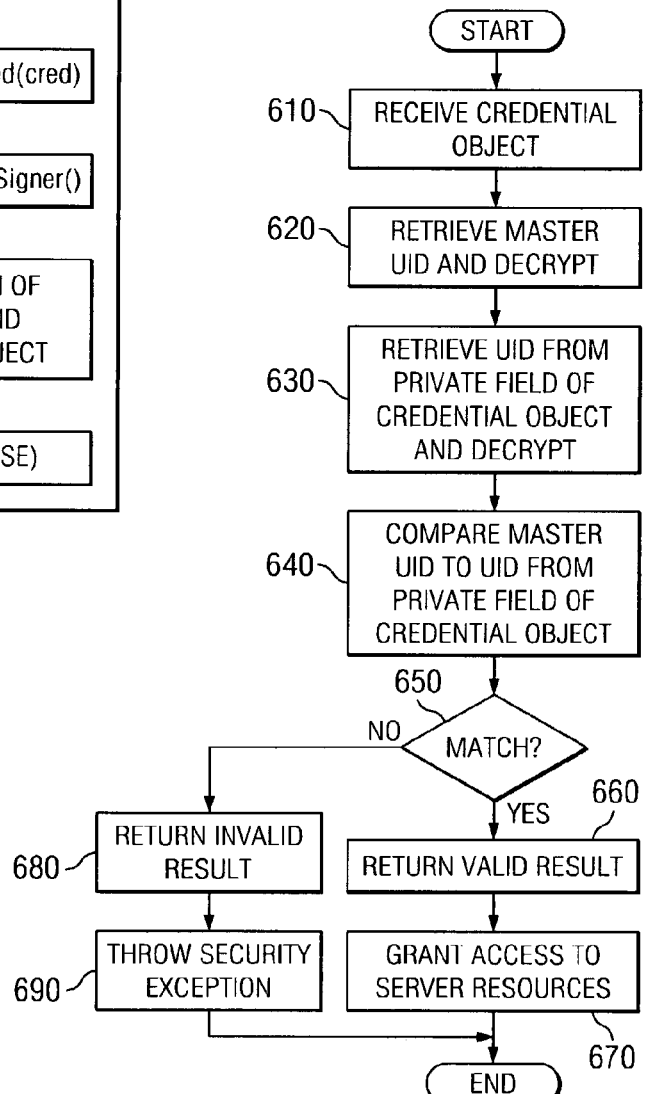
FIG. 6 is a flowchart outlining an exemplary operation of the present invention.

FIG. 6 is a flowchart outlining an exemplary operation of the present invention when validating a credential object. As shown in FIG. 6, the operation starts with receipt of a credential object (step 610). The master UID is then retrieved and decrypted (step 620). The UID from the private field in the credential is retrieved and decrypted (step 630). A comparison is performed between the master UID and the UID from the credential object (step 640) and a determination as to whether the credential object is valid is made (step 650). If the credential object is determined to be valid, a "valid" result is returned (step 660) and access to server resources is permitted (step 670). If the credential object is determined to be invalid, an "invalid" result is returned (step 680) and a security exception is thrown (step 690).

Thus, the present invention provides a mechanism for ensuring that a credential, or other security sensitive class interface, is a valid credential created by a server runtime environment. In this way, if a rogue application were to attempt to use a credential that meets the requirement of the credential interface with the runtime environment, the rogue application still would not be provided access to server resources since it is unlikely that the rogue application will be able to generate the correct UID to insert into the credential object. As a result, the credentials supplied by the rogue application will not be validated by the mechanisms of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for securing a server runtime environment, comprising:

generating a first unique identifier at startup of the server runtime environment, the first unique identifier being an identifier that is valid for the server runtime environment;

encrypting the first unique identifier;

storing the first unique identifier in a private location of the server runtime environment;

receiving a request to instantiate a first credential object from a requestor;

instantiating the first credential object, wherein the first unique identifier is inserted in a private field of the first credential object;

returning the first credential object to the requestor;

receiving a second credential object, wherein the second credential object contains a second uniquely encrypted unique identifier stored in a private field of the second credential object;

passing the second credential object as parameters to a verification class, wherein the verification class retrieves the encrypted first unique identifier from the private location of the server runtime environment and retrieves the uniquely encrypted second unique identifier from the private field of the second credential object;

decrypting the encrypted first unique identifier and the uniquely encrypted second unique identifier;

comparing the second unique identifier to the first unique identifier; and validating the second credential object only if the second unique identifier matches the first unique identifier.

2. The method of claim 1, wherein the first unique identifier is a pseudo-randomly generated set of alphanumeric characters.

3. The method of claim 1, wherein the first unique identifier is stored in a private class of the server runtime environment.

4. The method of claim 1, wherein validating the second unique identifier to the first unique identifier includes performing a byte array comparison between the second unique identifier and the first unique identifier.

5. The method of claim 1, further comprising:

receiving a request to instantiate a second credential object; and inserting the first unique identifier in a private field of the second credential object such that the first credential object and the second credential object include the same first unique identifier.

6. The method of claim 1, wherein the server runtime environment is a Java 2 Security runtime environment.

* * * * *